(12) United States Patent
Morgan (10) Patent No.: US 7,104,409 B2
(45) Date of Patent: *Sep. 12, 2006

(54) ADJUSTABLE STORAGE RACK FOR POTS, PANS AND LIDS

(76) Inventor: Fletcher Morgan, 4990 Coquina Key Dr., SE., St. Petersburg, FL (US) 33705

( * ) Notice: Subject to any disclaimer, the term of this patent is extended or adjusted under 35 U.S.C. 154(b) by 441 days.

This patent is subject to a terminal disclaimer.

(21) Appl. No.: 10/388,504

(22) Filed: Mar. 17, 2003

(65) Prior Publication Data

US 2003/0173313 A1    Sep. 18, 2003

Related U.S. Application Data

(63) Continuation-in-part of application No. 10/194,283, filed on Jul. 15, 2002, now abandoned, which is a continuation-in-part of application No. 29/156,657, filed on Mar. 6, 2002, now Pat. No. Des. 471,768, and application No. 10/388,504, Mar. 17, 2003, which is a continuation-in-part of application No. 10/309,098, filed on Dec. 4, 2002, now Pat. No. 6,729,479, which is a continuation-in-part of application No. 29/170,482, filed on Nov. 7, 2002, now Pat. No. Des. 481,264.

(51) Int. Cl.
*A47G 19/08* (2006.01)
(52) U.S. Cl. ..................................... 211/41.1
(58) Field of Classification Search ............. 211/41.11, 211/41.1, 41.3, 41.2, 40, 181.1; D6/462
See application file for complete search history.

(56) References Cited

U.S. PATENT DOCUMENTS

| D27,603 | S   | 8/1897  | Scott  |
| D27,604 | S   | 8/1897  | Scott  |
| D28,437 | S   | 3/1898  | Jones  |
| 910,057 | A   | 1/1909  | Greener |
| 2,190,065 | A | 3/1940  | Griffin |
| 2,516,088 | A | 7/1950  | Einhorn |
| 2,536,268 | A | 1/1951  | Dillion |
| D167,483 | S  | 8/1952  | Russo  |
| D181,365 | S  | 11/1957 | Miller |
| 2,891,676 | A | 6/1959  | Miller |
| 3,013,670 | A | 12/1961 | Mayer  |
| 3,164,108 | A | 1/1965  | Romero |
| 4,592,471 | A | 6/1986  | Bross  |
| 4,756,582 | A | 7/1988  | Heien  |
| 4,943,029 | A | 7/1990  | Szuster |
| 5,547,087 | A | 8/1996  | Licari |
| 5,660,284 | A | 8/1997  | Vaughn |
| D481,264 | S * | 10/2003 | Morgan ........................ D7/601 |
| 6,729,479 | B1 * | 5/2004 | Morgan .................... 211/41.11 |

* cited by examiner

*Primary Examiner*—Sarah Purol
(74) *Attorney, Agent, or Firm*—John S. Hale; Gipple & Hale

(57) ABSTRACT

A storage rack for storing pots, pans, skillets and lids comprising an adjustable storage rack constructed with a stand and a base member mounted to the stand. A plurality of wire members are mounted on clamp members which are mounted on rails secured to the base member. The clamp member can be slidably positioned on the rails prior to the securing of them in a fixed position on the rails and extending upward from the base member. A plurality of wire members have sleeve assemblies forming the upright supports, the sleeve assemblies providing height adjustment of the wire member. A spring biased handle is mounted to the base member and is biased to return to its original position after the handle is released.

18 Claims, 6 Drawing Sheets

ADJUSTABLE STORAGE RACK FOR POTS, PANS AND LIDS

CROSS-REFERENCE TO RELATED APPLICATIONS

This a continuation-in-part application of U.S. patent application Ser. No. 10/194,283, filed Jul. 15, 2002 now abandoned which is a continuation-in-part of U.S. Design Patent Application Ser. No. 29/156,657 filed Mar. 6, 2002 now U.S. Pat. No. Des 471,768 and U.S. patent application Ser. No. 10/309,098, filed Dec. 4, 2002 now U.S. Pat. No. 6,729,479 which is a continuation-in-part application of U.S. Design Patent Application No. 29/170,482 filed Nov. 7, 2002 now U.S. Pat. No. Des 481,264.

TECHNICAL FIELD OF THE INVENTION

The present invention generally relates to a storage rack and more specifically is directed toward an adjustable storage rack with horizontally and vertically moveable upright wire members for holding cooking pots, pans, skillets and their respective lids.

BACKGROUND OF THE PRIOR ART

Most cooks have accumulated a collection of covered cookware that range over many sizes of pots and pans and containers with lids. Even those householders who do not consider themselves as real cooks have an assortment of covered containers in which to cook food both on top of a stove and in an oven. Thus almost all kitchens contain significant numbers of pots, pans and other cooking containers and lids for same. The cooking containers and their respective lids must be stored when they are not in use and this problem, may be compounded by the lack of storage space in many kitchens.

Where and how these cooking containers are stored may vary substantially from kitchen to kitchen. In some instances, pots and cooking containers are stacked in a nested fashion with the largest diameter pot on the bottom and successively smaller pots on top. While this might be a relatively efficient way to store pots, pans and other cooking vessels such as casseroles, the lids and covers usually cannot be stored effectively in a nested stack. Most kitchens which use this nesting stack storage method for pots also have a disorganized pile of lids and covers. The cook then must rummage through the pile to locate the correct lid for the container he or she wants to use and move stacks of containers. In a home kitchen this exercise is very frustrating and can be quite chaotic when people and children gather in the kitchen during cooking of the meal.

Some cooks simply cover their pots and pans with the lids and store them side-by-side, on cabinet shelves. Although this method allows the cook to locate the correct lid quickly, it requires significantly more storage space than stacking or nesting the containers. Many home kitchens simply do not have the storage space to store the numbers of cooking containers required by large families or serious cooks.

A storage rack is useful for holding pots, pans, skillets and lids for same. In the prior art, shaped wire stands have been used to elevate an appliance or cooking container or to provide open storage for related use utensils, splatter screens and similar items.

U.S. Pat. No. 2,516,088 issued Jul. 18, 1950 is directed toward a folding dish drying rack formed from round wire stock which has a protective coating of rubber or synthetic resin. A plurality of elements are pivotally supported between an adjacent pair of longitudinal rods. Each element is mounted with a crank portion positioned outwardly and a lug portion positioned inwardly for attachment to and manipulation by a push bar. The push bar is slidably mounted in slots formed in a pair of mounting plates secured to the ends of a base.

U.S. Pat. No. 5,660,284 issued Aug. 26, 1997 is directed toward a storage rack for holding and storing cooking container lids and like shaped objects. The rack has a base with a pair of feet allowing it to be placed in a vertical or horizontal position. A plurality of adjustable crosspieces forming rests or steps are positioned at desired locations along the edges of the bracket members to hold the container lids at a storage angle.

Other commonly used types of stands are a wire rack with legs and supports such as that shown in U.S. Pat. Nos. 2,190,065, 2,891,676, 3,013,670, 3,164,108, 4,592,471, 4,756,582 and 4,943,029.

The prior art, therefore, has failed to provide a storage rack or holder for cooking containers and their lids and covers that may be easily assembled by the purchaser or by a consumer, that may be positioned in convenient orientations both horizontally and vertically and which can be easily adjusted as needed to hold and store a number of containers and lids of varying and different dimensions. Consequently, there is a need for such a rack in the home kitchen to allow storage areas to be organized effectively and efficiently to reduce clutter and provide the time savings which result when storage spaces are organized.

Accordingly, the novel storage rack has been developed to hold pots, pans, skillets and lids which resolves the problems of counter and cabinet space, cluttered storage, mislaid lids, matching lids to containers, allowing containers and lids to be consolidated and hidden from sight in a cabinet or enclosed area, as well as being easily cleaned.

SUMMARY OF THE INVENTION

The present invention is directed toward an adjustable plastic coated wire storage rack comprising a stand which can be affixed to a planar surface, a base member moveably mounted to the stand and a plurality of horizontally moveable wire members mounted on tubular rails secured to the base member extending upward from the tubular rails. The plurality of wire members include "U" shaped wire members of varying fixed heights and at least one wire member which is adjustable in height with an offset lid seating assembly. The lid seating assembly has a notch on each side and a rearwardly directed curved retaining member constructed to hold lids. The height adjustable wire members have parallel side posts provided with a threaded portion and an adjustment member which is rotatable on the post and angularly extending feet which are mounted in tubular clamps which are in turn secured to a rail mounted on the base member. A spring mounted handle is rotatably mounted on one end of the base member and is biased to return to an upright position after use.

It is an object of the present invention to provide a storage rack for cooking containers and their covers and lids which can be custom assembled by the purchaser or consumer to accommodate a specific collection of cooking containers and lids without the need of tools, fasteners or adhesives.

It is an additional object of the present invention to provide for a storage rack which can have individual members horizontally adjusted and vertically adjusted.

It is a further object of the present invention to provide an adjustable storage rack for cooking containers and lids that can be sized to hold all of the containers and/or lids for a selected set or brand of cookware.

It is yet another object of the invention to provide a storage rack which can be easily assembled with a minimum of instructions and general lack of mechanical skill by the consumer.

It is yet another object of the invention to provide the user with storage rack for storage of cooking utensils allowing for easy access of same for use as well as reducing the amount of counter space and cabinet space needed for such storage.

It is a further object of the invention to provide an adjustable storage rack which may be easily and inexpensively fabricated from round wire stock or other suitable materials having strength and durability.

In the accompanying drawings, there is shown illustrative embodiments of the invention from which these and other objectives, novel features and advantages will be readily apparent.

DETAILED DESCRIPTION OF THE INVENTION

The cooking container and lid storage rack of the present invention is ideally suited for use in the home as it provides a compact storage rack for cooking skillets, containers and their respective lids and covers that allows easy access to the same. The capability to vary the height of the wire support members and the distance between same allows the consumer to customize the rack as needed to hold a varied assortment of containers and lids. The preferred embodiment of the storage rack of the present invention is designed to be assembled by the user and is fully adjustable to hold a number of cooking containers and their respective lids of different heights and diameters at an optimum storage angle.

Figure 1:
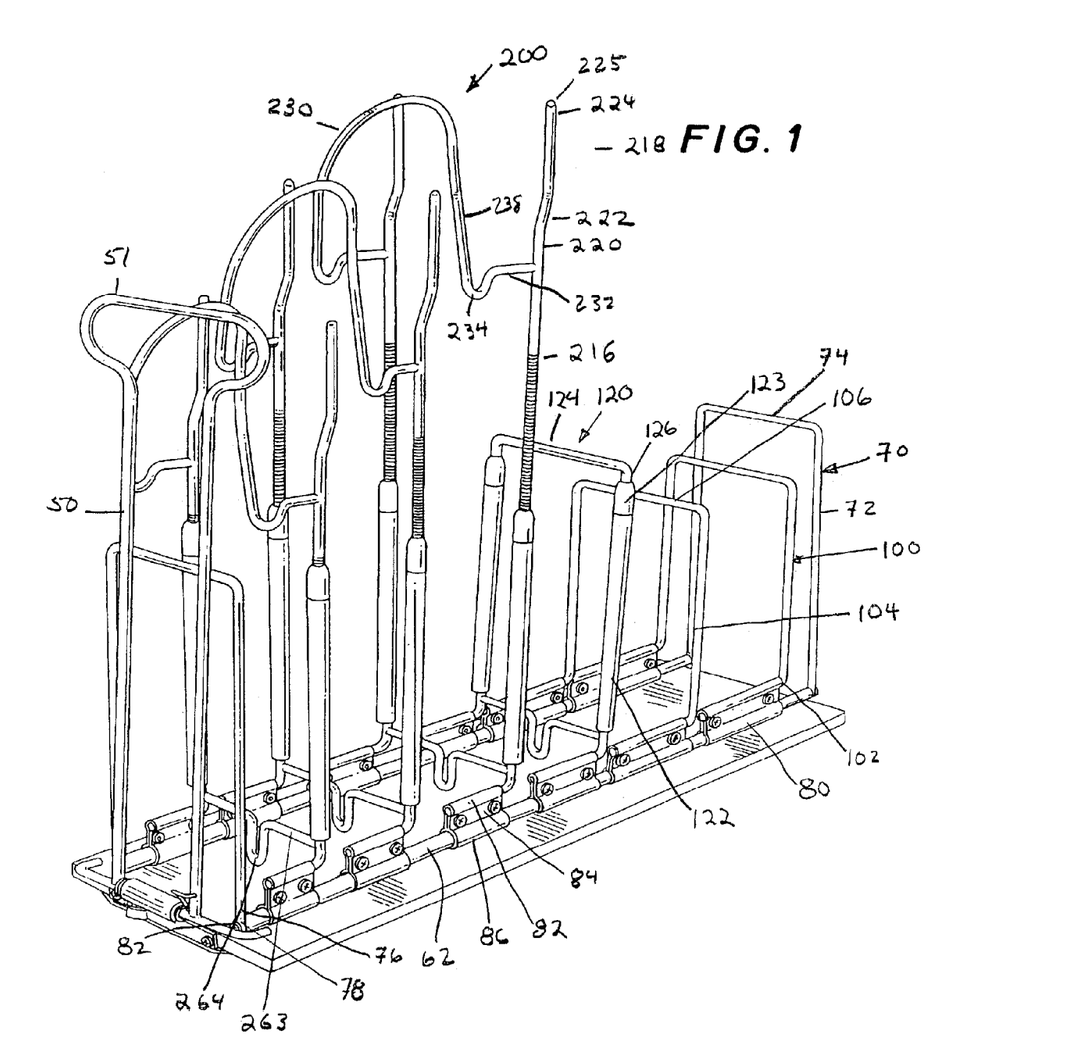
FIG. 1 is a perspective view of the adjustable storage rack for pots, pans and lids.
Figure 2:
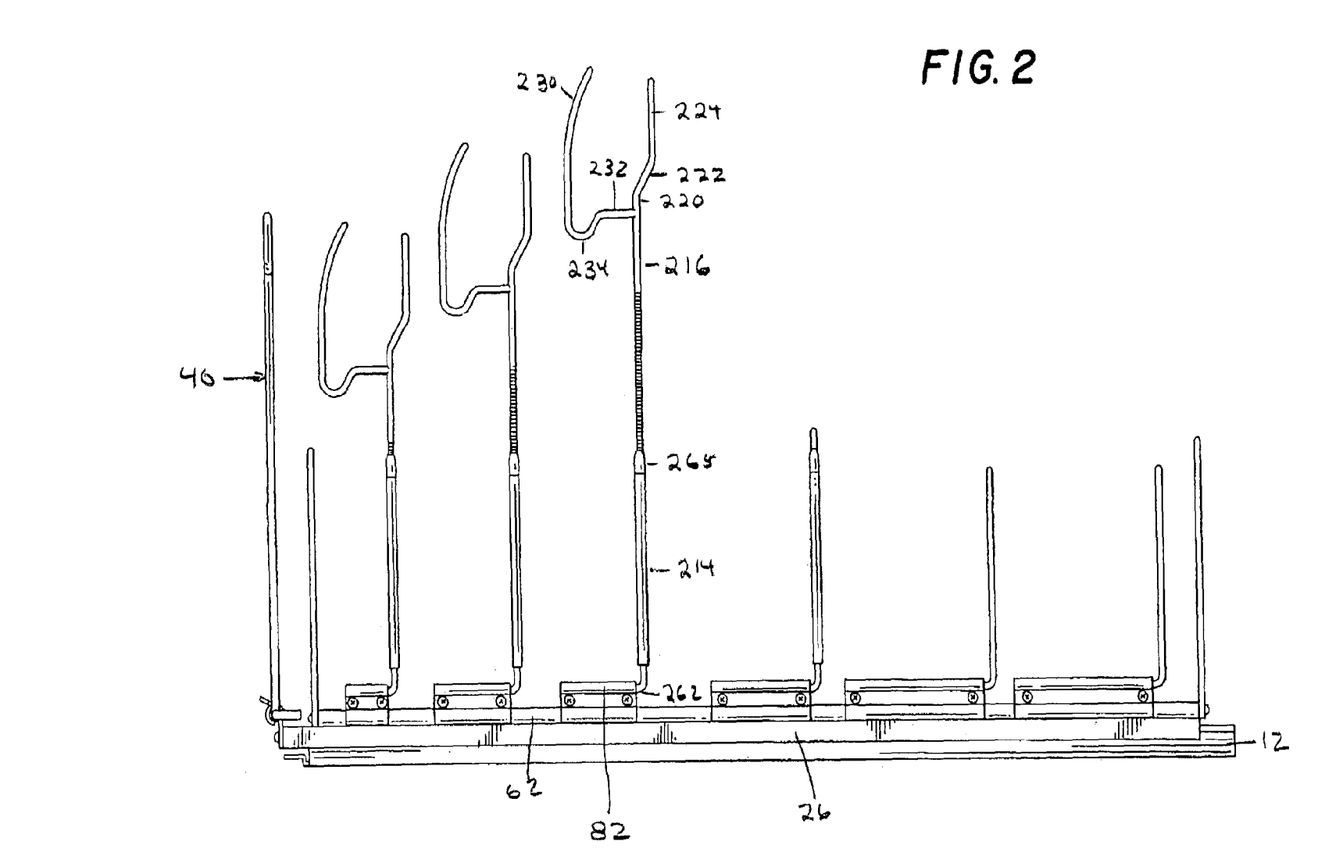
FIG. 2 is a side elevational view of the storage rack of FIG. 1.
Figure 3:
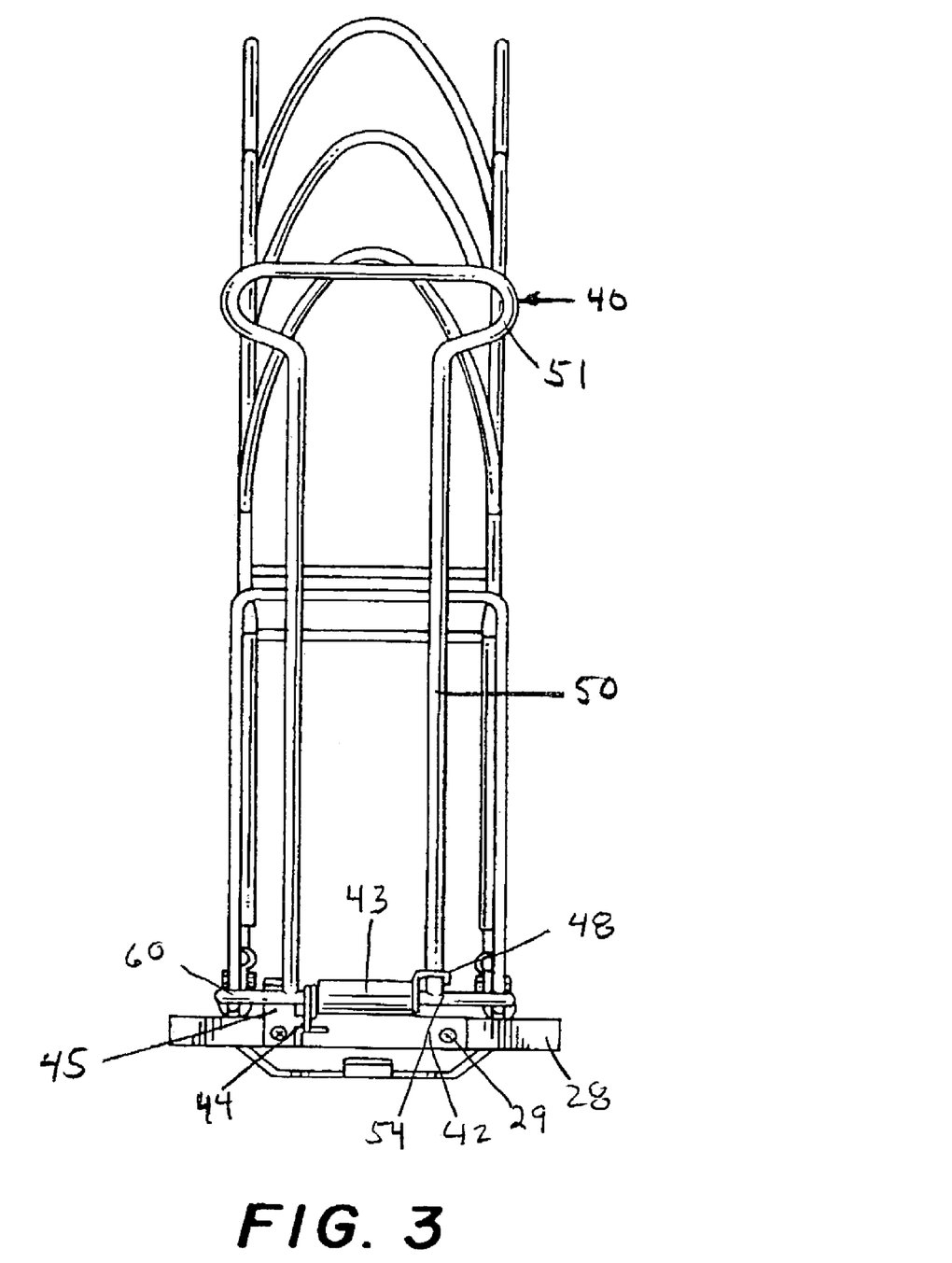
FIG. 3 is a front elevational view of the storage rack of FIG. 1.
Figure 4:
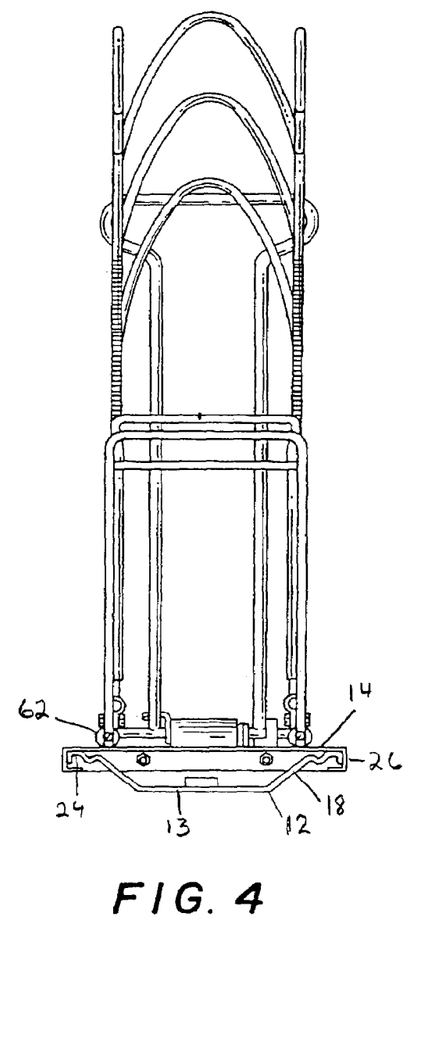
FIG. 4 is a rear elevational view of the storage rack of FIG. 1.
Figure 4A:
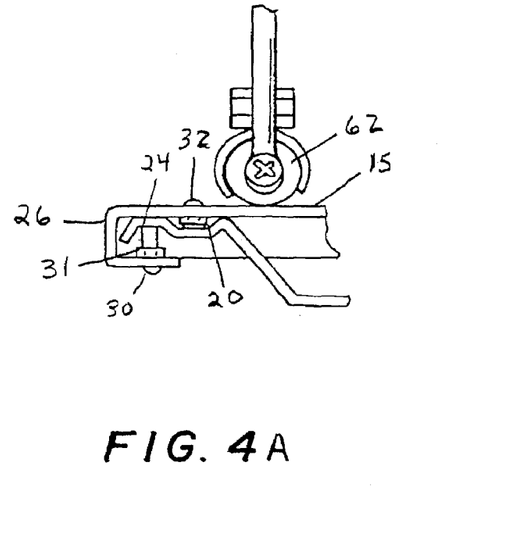
FIG. 4A is a partial enlarged view of base and support mounting in FIG. 4.
Figure 5:
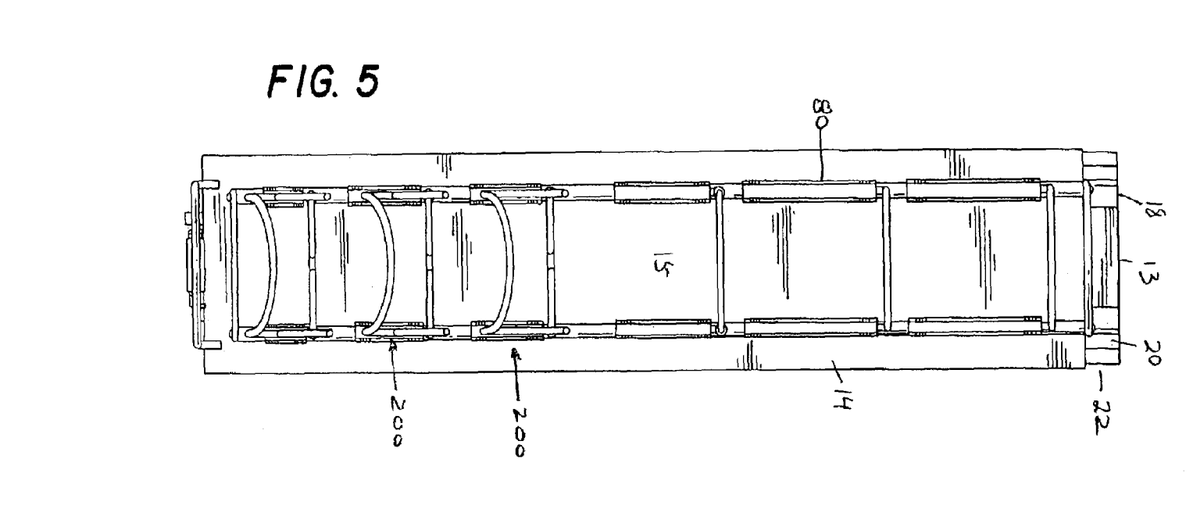
FIG. 5 is a top plan view of the storage rack shown in FIG. 1.
Figure 6:
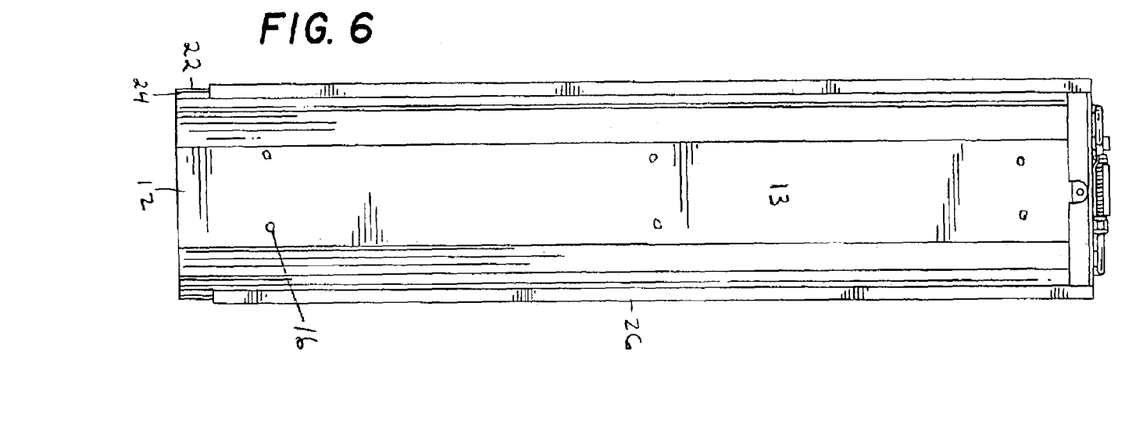
FIG. 6 is a bottom plan view of the storage rack shown in FIG. 1.

The preferred embodiment and best mode of the adjustable storage rack invention is shown in FIGS. 1–7. The adjustable pot, pan and lid storage rack assembly 10 is constructed with a support member 12 as shown in FIGS. 2, 4 and 6 which can be mounted to a planar surface and a base member 14 moveably mounted on the support member 12 as will later be described. The support member 12 is substantially shaped with a bottom planar surface 13 into which a number of aligned holes 16 are cut allowing the support member 12 to be mounted by screws or bolts to a planar surface such as a shelf. Each side of the support member 12 is angled upward at 18 away from the planar section 13 and bent to form a top groove 20 and a outer edge 22 which is bent downward to form a bottom groove 24 as seen in FIGS. 4 and 4A. The base member 14 has side portions 26 which are bent into a U" shape to fit over outer edge 22. The front of the base member has a downwardly extending flange 28 having holes 29 in which a handle yoke 42 is mounted as can be seen in FIG. 3. A coil spring 44 is mounted in yoke 42 with one end of the spring 44 forming an arm 46 which extends upward and is curved back to form an angular "C" shaped end 48. The "C" shaped end 48 engages a post 50 of the handle 40 biasing it rearward so that when the handle is pulled, it rotates forward away from the front of the storage rack and upon release of the pulling force, is biased backward toward the front of the storage rack. The handle 40 has two posts 50, each of which has a yoke mounting bar 54 secured to its lower end. The posts are connected at their upper end by an outwardly curved cross member 51. One end (not shown) of the yoke mounting bar 54 extends inwardly and is mounted in the cylindrical housing 43 of the yoke and the other end 58 extends outwardly and has a right angled section 60 which acts as a stop on the top planar surface of the base. The yoke 42 also has a separated bent arm 45 having an inside edge positioned outside of a post 50, limiting outward movement keeping the handle mounted in the yoke. As seen in FIG. 4A, the base 14 has holes cut in its side portion 26 to hold a screw 30 and nut 31. The nut 31 is seated in bottom groove 24 of the support member 12 and serves a guide and retainer together with a screw and nut assembly 32 mounted in a hole cut through the top of the planar base 14 above the top groove 20 of the support member 12 to project therein to form a guide and retainer.

Two parallel support rails 62 which are substantially tubular in construction, have a semicircular upper surface or alternatively, a planar upper surface are secured to the top planar surface 15 of the base 14 by screwing or bolting th same to the planar surface. The support rails 62 are adapted to receive and hold clamps 80 which are mounted thereto and other pot or pan holding assemblies by holding the legs of the wire support members. The support rails 62 as noted have a circular cross section although a rectangular cross section or angular cross sections could be used. "U" shaped wire end assembly 70 constructed with posts 72 and a top cross member 74 are secured to each end of the support rails 62. The free ends 76 of posts 72 are flared at 78 and have a throughgoing hole which is adapted to receive a screw 82 which is inserted through the hole into a threaded bore formed in the end of the support rail 62. The threaded bore is preferably cut in the center axis of support trail 62 via a plug insert or if the rail is solid, into the end of the rail.

A plurality of spring steel clamp member 80 are mounted on the support rails 62. Each clamp member 80 is constructed with a small tube section 82 with an open slit bottom, on either side of which is an intermediate planar section 84 which in turn is curved to form an arcuate larger open sided rail engaging section 86. The two sides form opposing arcuate wall portions. The tube section 82 has a diameter which will receive the legs of the wire support members and has bottom open wall ends which lead into integrally formed spaced planar walls forming the intermediate section 84. The spaced apart arcuate spaced portions 86 are outwardly biased away from each other forming a partial tube or sectioned "C" portion of a larger diameter allowing the same to be mounted on the rails 62. It is envisioned that any form of support can hold tube section 86 on the support rails 62. The spaced arcuate section 86 fits around an exterior surface portion of the support rail 62 allowing the clamp member 80 to be slid along the support rail 62. The intermediate walls 84 define a plurality of aligned throughgoing holes through which a threaded fastener 90 such a nut and bolt are inserted. When the nut is tightened the intermediate walls 84 are forced together against the spring bias of the spring steel causing the arcuate or semicircular portions 86 to abut and engage against the exterior surface of the rail 62 holding the clamp assembly 80 securely against the rail 62 and securing the leg of the wire support member in the tube section 82.

A plurality of "U" shaped wire support members 100 are mounted in the clamp member 80 in the rear section of the base 14 with the legs 102 of the wire support members being mounted in the respective tube aperture of tube section 82 of the clamp assembly 80. The wire support members can be constructed with two parallel side posts 104 and an upper cross member 106 connecting the upper ends of the side posts 104. The legs 102 extend transversely outward from the axis of each side post 104 so that the same can be inserted into the tube section 82 of the clamp assembly 80.

These support members can be modified as shown by support member 120 which uses threaded posts 122 which are identical to those noted below. A modified cross piece 124 with transverse legs 126 is mounted into the threaded rotatable nut 123 on the respective post 122.

Figure 7:
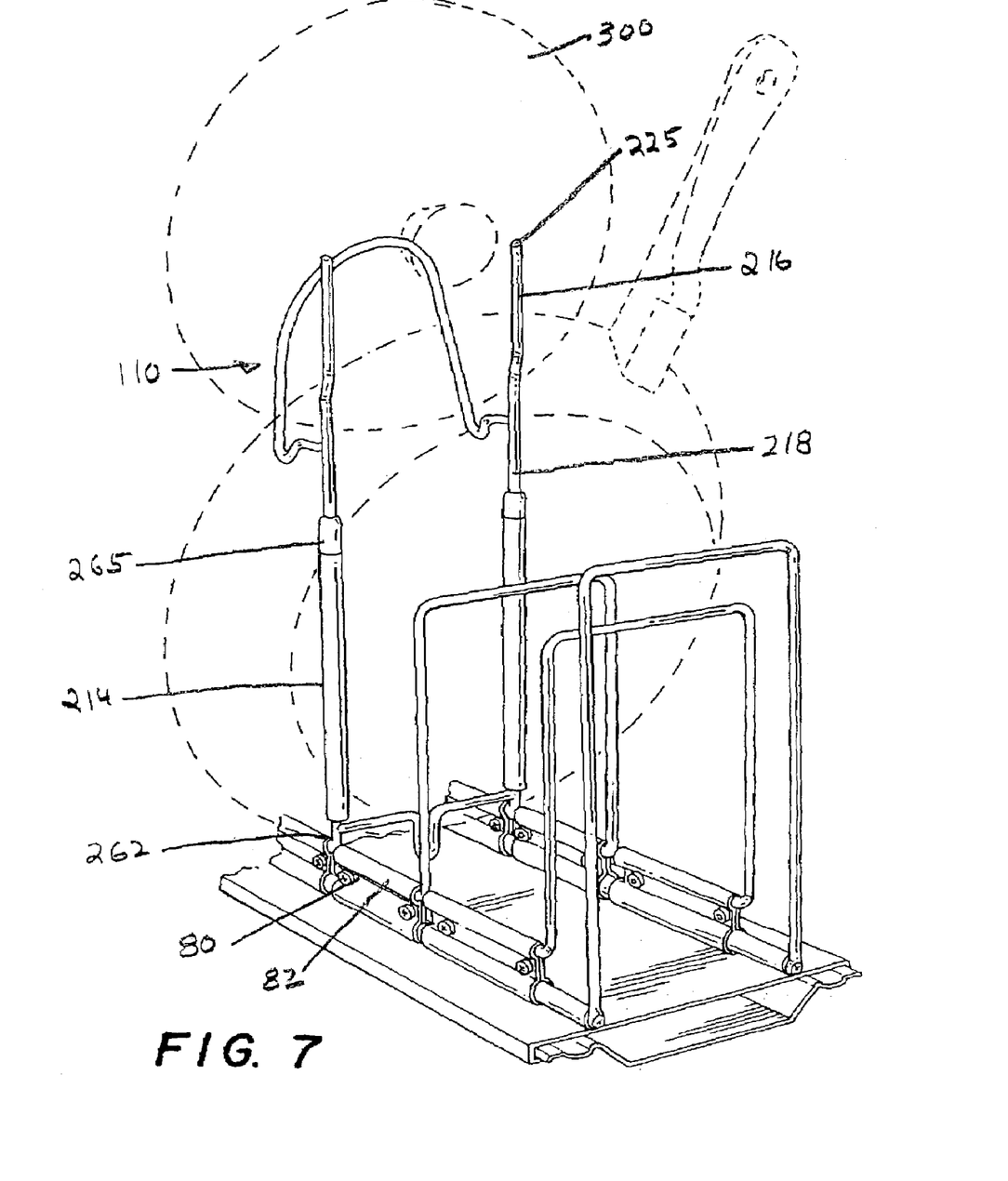
FIG. 7 is a partial perspective view of the offset lid holding assembly holding a skillet and lid shown in phantom.

The wire storage rack also contains a plurality of adjustable storage assemblies 200 as more clearly shown in FIGS. 1 and 7. Each assembly is constructed with two standards or posts 214, each having a mounting leg 262 transversely extending therefrom and a rotatable adjustment nut 265 on the distal end. A lid holding assembly 110, having a lower threaded section 216 and a coated unthreaded offset section 218 is mounted to the posts 214. The threaded section 216 is threaded into a threaded nut 265 which is rotatably mounted on the "L" shaped coated post 214 mounted in clamp assembly 80. Thus by rotating the nut 265, the threaded section can be raised or lowered. Each post 214 has a leg member 262 which extends transversely from the post for insertion in the tube section 82 of clamp member 80. Immediately above the leg member 262 is a cross support 263 (most clearly shown in FIG. 1) which connects and supports each post. The center of the cross support 263 with formed in an open downwardly projecting "C" shaped support and stop structure 264 which limits bending and distortion of posts and offset assembly when heavy pans and lids are placed therein. The offset section 218 has an upright segment 220 which has the same axis as the lower threaded section 216, an angled segment 222 which is angled at an angle ranging from 3° to 15°, preferably 5°, from the axis of the threaded section 216 and an upper segment 224 which is parallel to the axis of the threaded section 216. The end 225 of each upper segment 224 is rounded to prevent scratching of the lids and possible injury to the user. Upright segment 220 preferably has a length of one inch, angled segment 222 a length of ¾ inches and upper segment 224 a length of two inches.

A curved lid retainer member 230 is mounted to each of the standards 214 on the upright segment 220 above the threaded section 216. The curved lid holder member 230 has two legs 232, each of which extend transversely outward from the upright segment 220. Each leg 232 extends transverse to the standard and has a downward curved seating recess or configuration 234 which leads to upright straight leg section 238. Leg 232 preferably has a straight segment length of one inch heading to the recess 234 which has a diameter of ¾ inch, totaling 1¾ inches. The curved lid holder section 230 has straight legs 238 which are parallel to segments 220 and 224 of the offset section 218. The curved top retainer or crosspiece 230 is curved or bent backwards approximately 1 inch from the axis of legs 238 toward the offset section 218 and post at least a portion of recess 234 to hold a lid 300 as shown in FIG. 7 when the lid 300 is placed into the recess seat 234. A containment area for the lid 300 is formed by the offset standard section 218, legs 232 with recesses 234 and curved crosspiece 230. The backwardly curved crosspiece 230 is curved backwards from 20° to 40° from a vertical formed by a plane drawn between legs 238.

Each of the angled offset upright standard sections is formed with a blunt or rounded end 225 to preclude scratching of the cooking container and lids. In addition, each wire component, excepting the threaded section 216, is preferably coated with a rubber, a rubberized material or plastic coating such as PVC to prevent scratching of the cooking utensils and to protect the wires against rusting.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present inventions defined by the following claims.

What is claimed is:

1. An adjustable storage rack comprising a support member defining a channel, a base member moveably mounted on said support member, said base member being provided with guide means which extends into said support member channel, a plurality of wire members are mounted on said base member for selective positioning on said base member in a direction parallel to a longitudinal axis of said base member, at least one of said plurality of wire members is formed with an offset portion adapted to hold covers for pots and pans; and a moveable handle mounted to said base member, said handle being spring biased to return to an upright position.

2. An adjustable storage rack as claimed in claim 1 wherein at least two of said plurality of wire members include a lid seating assembly, each lid seating assembly comprising a lid retaining member provided with a plurality of legs, each leg being secured to a post member mounted to said base member and extending away from said post member, each leg defining a recessed seat therein and including a section which is substantially parallel to said post members, a retaining member interconnecting said legs and forming a cross support, said retaining member being orientated away from said parallel leg section and a bottom cross support member connecting and supporting said legs.

3. An adjustable storage rack as claimed in claim 2 wherein at least two of said wire members comprises a pair of "L" shaped posts having a transverse leg, each post being provided with a rotatable threaded nut means at its distal end away from said transverse leg and defining an internal bore.

4. An adjustable storage rack as claimed in claim 1 wherein said wire members are coated with plastic.

5. An adjustable storage rack as claimed in claim 1 wherein said base member has an upper planar surface and inwardly turned side flanges on its bottom surface and two rails mounted to said base member upper planar surface.

6. An adjustable storage rack as claimed in claim 5 wherein said rails are tubular.

7. An adjustable storage rack as claimed in claim 5 including a plurality of clamp assemblies mounted on each of said rails.

8. An adjustable storage rack as claimed in claim 7 wherein each of said clamp assemblies comprises a tube shaped structure defining at least one slot running the length of the tube, said tube shaped structures being of sufficient diameter to receive a leg of said wire member and is integrally formed with mounting means to engage an outer surface of said rail.

9. An adjustable storage rack comprising a support member defining a channel, a base member moveably mounted on said support member, said base member being provided with guide means which extends into said support member channel, a plurality of wire members mounted on said base member for selective positioning on said base member in a direction parallel to a longitudinal axis of said base member, a plurality of wire storage racks including a plurality of wire members with an offset portion adapted to hold covers for pots and pans, each wire storage rack comprising a plurality of post members mounted to a base, a lid seating assembly mounted on at least two post members, each of said post members having a rotatable threaded member at one end and defining a bore to receive standards of said lid seating assembly, said lid seating assembly comprising a wire seating member provided with a plurality of standards, each of which is mounted to a post member and legs extending from said standards defining a recessed lid seat therein and a curved member interconnecting said legs, said curved member being curved back towards said standards and at least one other "U" shaped wire member mounted to said base; said wire members being mounted on said base with clamp assemblies, each of said clamp assemblies comprising a tube shaped structure defining at least one slot running the length of the tube, said tube shaped structure being of sufficient diameter to receive a leg of said wire member and is integrally formed with mounting means to engage an outer surface of said rail.

10. An adjustable storage rack as claimed in claim 9 wherein said wire members are coated with plastic.

11. An adjustable storage rack as claimed in claim 9 wherein said base member has an upper planar surface and inwardly turned side flanges and two rails mounted to said base member upper planar surface.

12. An adjustable storage rack as claimed in claim 9 wherein said storage racks are plastic coated.

13. An adjustable storage rack comprising a stand and a base member moveably mounted to said stand, said base member comprising a base member with a planar upper surface and inwardly turned sides which are turned around end edges of said stand, a plurality of rail members mounted on said planar upper surface, a plurality of wire member assemblies mounted to said rail members for selective movement along said rail members having at least one cross support, said wire member assemblies extending upward from said rail member, at least one wire member assembly being secured in a stationary position on said rail member and a handle moveably mounted to said base member, said handle being spring biased to return to an original position.

14. An adjustable storage rack as claimed in claim 13 wherein said base member includes a plurality of clamp mechanisms which can be secured to said rail members.

15. An adjustable storage rack as claimed in claim 13 wherein at least two of said plurality of wire member assemblies include a lid seating structure, each lid seating structure comprising a lid retaining member provided with a plurality of legs, each leg being secured to a post member and extending away from said post member, each leg defining a recessed seat therein and including a section which is substantially parallel to said post members, a retaining member interconnecting said legs and forming a cross support, said retaining member being orientated away from said parallel leg section towards said standards and a bottom support member connecting said legs.

16. An adjustable storage rack as claimed in claim 15 wherein each said post member is "L" shaped, each post member being provided with a rotatable threaded nut means at its distal end and defining an internal bore.

17. An adjustable storage rack as claimed in claim 13 wherein said base member has an upper planar surface and inwardly turned side flanges which encompass side edges of said support member and two rails are mounted to said base member upper planar surface.

18. An adjustable storage rack as claimed in claim 17 wherein each base member has guide means secured thereto which are positioned in grooves defined by said support member to retain and guide said base member on said support member.

* * * * *